United States Patent
Abbestam

(10) Patent No.: US 9,290,327 B2
(45) Date of Patent: Mar. 22, 2016

(54) CONVEYOR CHAIN LINK, CONVEYOR CHAIN AND CONVEYOR SYSTEM COMPRISING CONVEYOR CHAIN

(71) Applicant: FlexLink AB, Göteborg (SE)

(72) Inventor: Göran Abbestam, Partille (SE)

(73) Assignee: FlexLink AB (SE)

( * ) Notice: Subject to any disclaimer, the term of this patent is extended or adjusted under 35 U.S.C. 154(b) by 0 days.

(21) Appl. No.: 14/381,172

(22) PCT Filed: Mar. 20, 2013

(86) PCT No.: PCT/SE2013/050308
§ 371 (c)(1),
(2) Date: Aug. 26, 2014

(87) PCT Pub. No.: WO2013/141807
PCT Pub. Date: Sep. 26, 2013

(65) Prior Publication Data
US 2015/0060243 A1 Mar. 5, 2015

(30) Foreign Application Priority Data

Mar. 20, 2012 (SE) .................................... 1250273-8

(51) Int. Cl.
*B65G 17/06* (2006.01)
*B65G 17/40* (2006.01)
(Continued)

(52) U.S. Cl.
CPC ............. *B65G 17/40* (2013.01); *B65G 17/08* (2013.01); *B65G 17/086* (2013.01); *B65G 17/44* (2013.01)

(58) Field of Classification Search
CPC ..... B65G 17/06; B65G 17/065; B65G 17/067
USPC .................. 198/850, 851, 852, 853
See application file for complete search history.

(56) References Cited

U.S. PATENT DOCUMENTS 6,247,583 B1 *  6/2001  Coen et al. ............ 198/852
6,250,459 B1 *  6/2001  Coen et al. ............ 198/852
(Continued)

FOREIGN PATENT DOCUMENTS

CA   1217162 A1   1/1987
DE   10207687 A1   9/2003
(Continued)

OTHER PUBLICATIONS

"International Application Serial No. PCT/SE2013/050308, International Preliminary Report on Patentability mailed Mar. 27, 2014", 12 pgs.

(Continued)

*Primary Examiner* — Douglas Hess
(74) *Attorney, Agent, or Firm* — Schwegman Lundberg & Woessner, P.A.

(57) ABSTRACT

A conveyor chain link, comprising an upper body having a carrying surface, and a lower body having a front end and a rear end, where the upper body and the lower body are separate parts, where the upper body is provided with a longitudinal slot adapted to cooperate with a protruding tongue on the front end of the lower body, with at least one forward bearing surface arranged perpendicular to the center line of the chain link and adapted to bear on at least one first bearing surface of the lower body, with two sideway bearing surfaces adapted to bear on two second bearing surfaces of the lower body, and at least one locking means adapted to lock the upper body to the lower body fixedly and irremovably. The advantage of the chain link is that a chain link with different properties for the lower body and the upper body is provided for, where the upper and lower bodies are fixedly locked to each other.

14 Claims, 3 Drawing Sheets

(51) Int. Cl.
  *B65G 17/08* (2006.01)
  *B65G 17/44* (2006.01)

(56) References Cited

U.S. PATENT DOCUMENTS

| | | | |
|---|---|---|---|
| 6,347,699 B1 | 2/2002 | Ramsey | |
| 6,364,094 B1 | 4/2002 | Alstmar | |
| 6,736,259 B1 * | 5/2004 | Funabashi | 198/852 |
| 6,758,328 B2 * | 7/2004 | Arai et al. | 198/852 |
| 7,044,290 B2 * | 5/2006 | Garbagnati et al. | 198/852 |
| 7,073,662 B2 * | 7/2006 | Neely et al. | 198/850 |
| 7,367,448 B2 * | 5/2008 | Fandella | 198/853 |
| 7,731,021 B2 * | 6/2010 | Melancon et al. | 198/853 |
| 7,896,766 B2 | 3/2011 | Mitzschke et al. | |
| 8,016,103 B2 * | 9/2011 | Krischer | 198/853 |
| 8,505,715 B2 * | 8/2013 | Andreoli et al. | 198/852 |

FOREIGN PATENT DOCUMENTS

| | | |
|---|---|---|
| EP | 1975093 A1 | 10/2008 |
| GB | 1537876 A | 1/1979 |
| WO | WO-2013/141807 A1 | 9/2013 |

OTHER PUBLICATIONS

"International Application Serial No. PCT/SE2013/050308, International Search Report mailed Jul. 5, 2013", 6 pgs.

* cited by examiner

CONVEYOR CHAIN LINK, CONVEYOR CHAIN AND CONVEYOR SYSTEM COMPRISING CONVEYOR CHAIN

RELATED APPLICATIONS

This application is a U.S. National Stage application filed under 35 U.S.C. §371 from International Application Serial No. PCT/SE2013/050308, filed Mar. 20, 2013 and published as WO 2013/141807 A1 on Sep. 26, 2013, which claims the priority benefit of Sweden Patent Application No.: 1250273-8, filed Mar. 20, 2012, the contents of which applications and publication are incorporated herein by reference in their entirety.

TECHNICAL FIELD

The present invention relates to a conveyor chain comprising two different materials and a conveyor chain comprising a plurality of such conveyor chain links. The conveyor chain link is adapted to be used in a conveyor system comprising an endless chain.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via supporting means. Larger objects are often conveyed on supporting means also known as pallets, and smaller objects may be conveyed using a small carrier often referred to as a carrier puck. Many objects are conveyed directly by the conveyor chain.

The conveyor chain is forwarded by a drive unit comprising a motor. The conveyor chins runs in conveyor beams and glides on slide rails attached to the conveyor beams. Both the conveyor chain and the slide rails may be made from a low friction material in order to reduce power consumption, to reduce wear and to reduce noise caused by vibrations. In the forward direction, i.e. when the chain transports objects, the underside of the upper body bears on upper slide rails of the conveyor beam. In the return direction, i.e. when the chain travels upside down in the return path, the upper side of the conveyor chain may be supported by a bearing surface on which the conveyor chain glides. The conveyor chain may also be provided with tabs or protrusions by which the chain may bear on an inner slide rail of the conveyor beam.

One problem with a sliding contact between the conveyor chain and the conveyor beams is that friction is created. One way of reducing friction is to use a low friction material in the chain links and in the slide rails. It is however not always possible to select a low friction material for the conveyor chain. For some types of transportation, it is required that the conveyor chain is ESD proof, i.e. that the conveyor chain is not charged with static electricity. In this case, the material of the conveyor chain must contain particles that allow the conveyor chain to conduct electricity. Such a material has a reduced wear resistance and a higher friction value.

In other cases, a high friction material may be required on the carrying surface of the conveyor chain. In some environments, it is of advantage to provide the conveyor chain top in a metal or metal compound material. It is however complicated to manufacture the complete chain link in metal.

It would thus be of advantage to use chain links comprising different materials with different properties.

In EP 1 975 093 A1, a chain comprising inner and outer links (2, 3) is described. The inner and outer links comprise separate upper plates attached to the inner and outer links by resilient catches which are inserted into receiving slots in the inner and outer links.

U.S. Pat. No. 6,347,699 B1 describes a two piece pivot chain link which through its construction allows the top platform piece to be removably replaceable. The top platform is provided with resilient snap tabs adapted to be inserted into a main body orifice. The top platform is removed by pressing one of the snap tabs.

DE 102 07 687 A1 describes a transport chain having chain links comprising lower guide pieces and upper support pieces. A support piece is provided with resilient catches which are inserted into an opening of the guide piece having protruding noses for attaching the support piece to the guide piece. A locking member can be inserted between the catches to lock the upper piece in place.

GB 1537876 A describes a conveyor chain having overlapping slats forming an upper surface of the conveyor chain. The slats are attached to the slat carriers by resilient pawls which engage cavities in the slat carrier. The slats can be easily removed and replaced.

In the above solutions, the upper portion of the chain link is attached to the lower portion by means of resilient catches. The resilient catches may be pressed on such that the catch moves away from the catching surface in order to remove the upper portion. With such a solution, there is a risk that the catches disengage unintentionally, e.g. when the conveyor system has a malfunction or when an excessive force is applied to the conveyor chain link.

U.S. Pat. No. 6,347,699 B1 describes a conveyor chain comprising a main body and a top platform piece, where the top platform piece can be easily removed and replaced.

CA 1,217,162 describes a conveyor chain comprising removable top slats that can be easily replaced. The lower connecting member is attached to a chain. The removal of the top slat allows the connection member to be attached to the chain.

These solutions work fine in some systems, but there are still room for improvements.

DISCLOSURE OF INVENTION

An object of the invention is therefore to provide an improved chain link where the upper body and the lower body are separate parts that are fixedly attached to each other in an irremovable way. A further object is to provide an improved chain link where the upper body is manufactured in another material than the lower body. A further object of the invention is to provide a chain link where the upper body is manufactured in a metallic material.

The solution to the problem according to the invention is described in the characterizing part of claim 1 for the chain link. Further claims are directed to a conveyor chain and to advantageous embodiments and further developments of the chain link.

In a conveyor chain link, comprising an upper body having a carrying surface, and a lower body having a front end and a rear end, where the upper body and the lower body are separate parts, the object of the invention is achieved in that the upper body is provided with a longitudinal slot adapted to cooperate with a protruding tongue on the front end of the lower body, with at least one forward bearing surface arranged perpendicular to the centre line of the chain link and adapted to bear on at least one first bearing surface of the lower body, with two sideway bearing surfaces adapted to bear on two second bearing surfaces of the lower body, and with at least one locking means adapted to lock the upper body to the lower body fixedly and irremovably.

By this first embodiment of the chain link according to the invention, the chain link will comprise an upper body and a lower body fixedly and irremovably attached to each other.

The upper body is provided with a longitudinal slot arranged in parallel with the centre line of the chain link. The centre line is parallel to the travel direction of the conveyor chain. The slot will cooperate with a tongue on the lower body such that the upper body is held in place both in a vertical direction and in a direction perpendicular to the centre line of the chain link. The slot and tongue may e.g. be shaped as a dovetail.

Further, the upper body is provided with at least one forward bearing surface adapted to transfer forces generated from the travel of the conveyor chain when bearing on at least one first bearing surface of the lower body. Especially, the forward bearing surface and first bearing surface will take up forces if the chain link jams or is caught on something since such a force will act in a direction opposite the travel direction of the conveyor chain. The force will thus press the forward bearing surface of the upper body against the first bearing surface of the lower body.

The upper body is also provided with sideway bearing surfaces adapted to carry forces perpendicular to the centre line of the chain link. The sideway bearing surface may be provided with an acute angle in relation to the centre line of the chain link. In this way, the sideway bearing surface will be able to take up sideway forces.

The upper body is further provided with locking means adapted to lock the upper body to the lower body in an irremovable way. Once the upper body is assembled to the lower body, it will act as a chain link produced in one piece.

The advantage of manufacturing the chain link in two parts is that different materials can be used for the upper body and the lower body. The lower body can be manufactured in a low friction material. The upper body can be manufactured in a material adapted for the use of the conveyor chain. One such use would be a conveyor chain adapted for ESD use. Since the material must be a conductive or static dissipative material, the material must contain conducting particles embedded in the material, such as graphite powder, which will weaken the material. Thus, the upper conductive part of the conveyor chain can be made from one material and the lower part can be made in another material, which has a higher wear resistance.

Another advantage is that the upper body can be made from a metallic material. To manufacture a complete conveyor chain link from a metallic material is both costly and difficult and is further not desirable since the wear on the slide rails of the conveyor beams will be higher for such a conveyor chain and because such a chain link will be relatively heavy. With the upper part of the chain link made from a metallic material, the wear of the slide rails is minimized. Since the upper part does not have any resilient catches, the upper part can be made of a non-resilient material, such as stainless steel. A further advantage of not having resilient catches to hold the upper body and lower body together is that there is no risk that a resilient catch will come loose during use of the conveyor chain or when the conveyor chain is caught up in something and jams.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
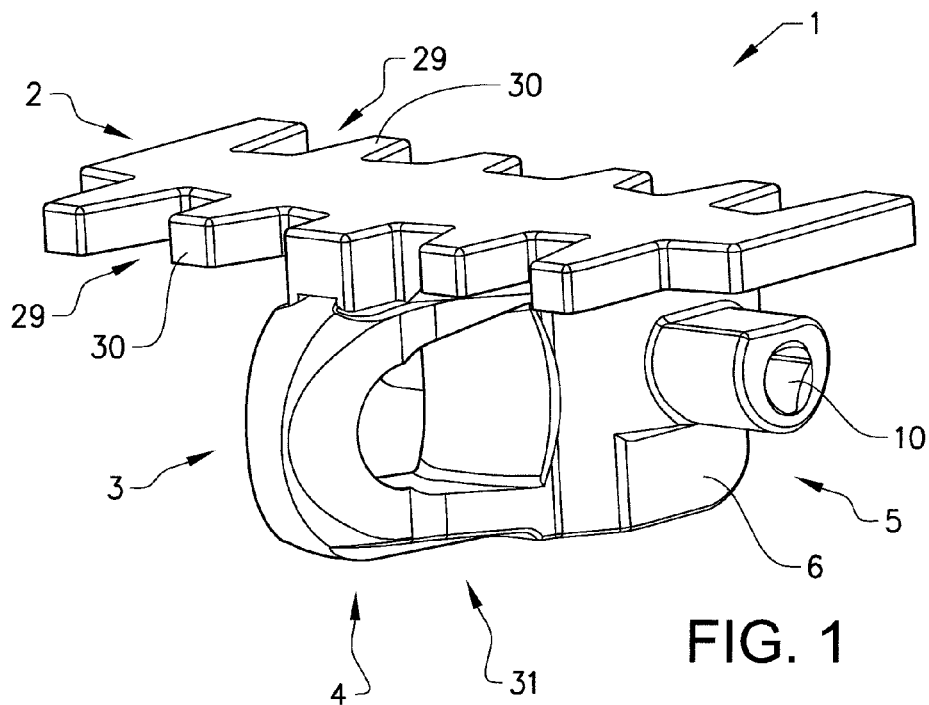
FIG. 1 shows a front perspective side view of a chain link according to the invention.
Figure 2:
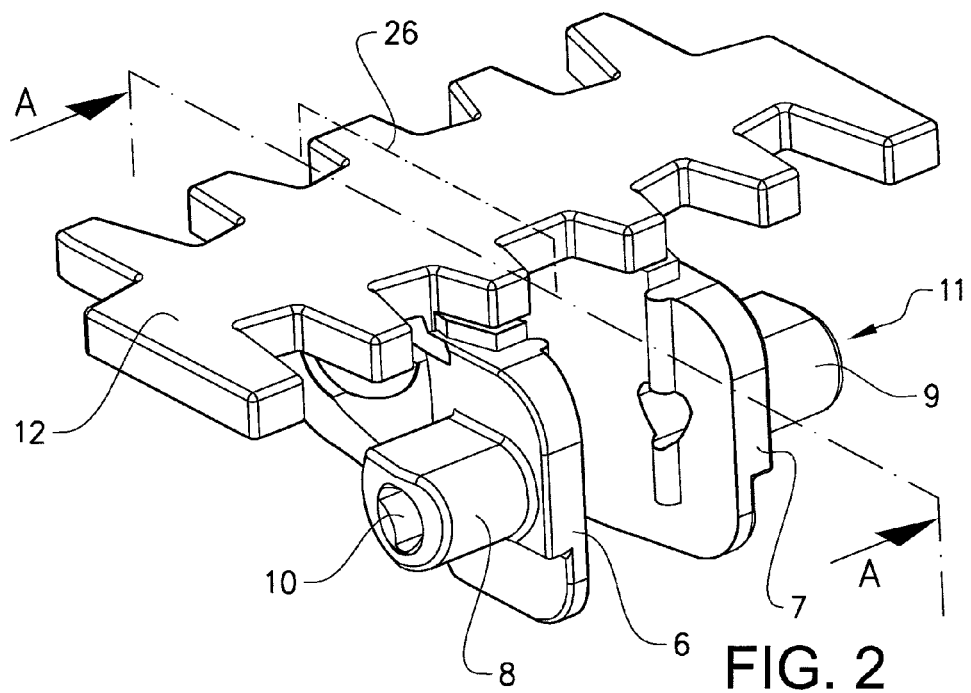
FIG. 2 shows a rear perspective side view of a chain link according to the invention.

In FIGS. 1 and 2, a chain link 1 which can form a part of a conveyor chain is shown. The chain link has an upper body 2 with an upper carrying surface 12 adapted to carry objects that are to be conveyed. The upper carrying surface is preferably shaped like a substantially flat surface having a plurality of notches 29 and teeth 30 arranged adjacent to the front end 4 and the rear end 5. The notches and the teeth are arranged to mesh with the corresponding notches and teeth of an adjacent chain link. Such upper body shapes are well-known in the art. Other upper body shapes are also conceivable.

The chain link is further provided with a lower body 3 which has a front end 4 and a rear end 5. The front end 4 has a substantially spherical bearing seat 31 which is arranged to cooperate with a bearing element 32 by partly embracing the bearing element which can be seen in FIG. 6. The rear end 5 has a first leg 6 and a second leg 7 arranged at a certain distance from each other, with the legs bifurcating out from the front end 4. The distance between the first leg and the second leg is such that the front end of a chain link fits between the first and second legs of an adjacent chain link when mounted in a conveyor chain. An opening 21 is thus created between the legs 6, 7.

The first leg 6 has a first protrusion 8 arranged substantially perpendicular to the travelling direction of the conveyor chain and facing outwards from the first leg. The protrusion is advantageously utilized as transport facilitating means, i.e. used as engagement means for cooperation with a drive wheel or the like, for example interacting with a cog wheel of a conveyor drive unit. The protrusion is further advantageously adapted to function as a sliding surface bearing on a slide rail in the return path of a conveyor chain. The first protrusion 8 has a first through hole 10 of a non-circular cross-section, preferably substantially triangular. The second leg 7 has a second protrusion 9 arranged opposite to the first protrusion 8 and facing outwards from the second leg. The second protrusion 9 has a second through hole 11 substantially coaxial with the first through hole 10 of the first protrusion 8 and of the same cross-section. The protrusion extends uniformly such that the protrusion resembles a tube shaped protrusion. In this way, the connecting pin adapted to be inserted into the through holes will be securely fastened due to the large contact surface of the protrusion.

Figure 6:
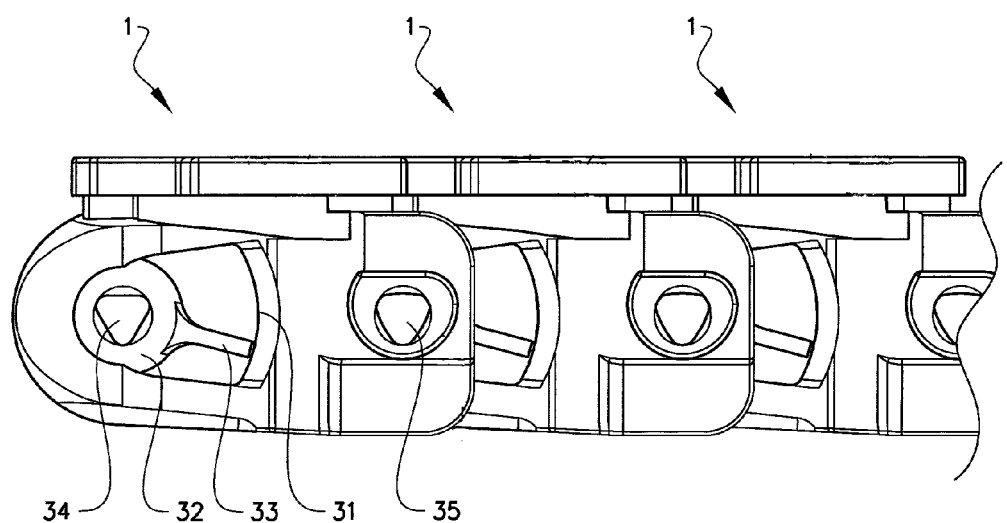
FIG. 6 shows a side view of a conveyor chain according to the invention.

The bearing element 32 is partly shown in FIG. 6 and comprises a substantially spherical main body having a third through hole 34 of a non-circular cross-section corresponding to the cross-section of the first through hole 10 and the second through hole 11. The bearing element 32 is arranged between the first leg 6 and the second leg 7. A force absorbing element 33 is arranged on the side of the bearing element 32 which faces the rear end 5 of the chain link 1. A connecting pin 35 is arranged to be inserted into the three trough holes 10, 11, 34 to securely hold the bearing element 32 in position in the travelling direction of the conveyor chain. The cross-sectional shape of the pin 35 corresponds to the cross-section of the three through holes 10, 11, 34 and is advantageously substantially triangular. The two ends of the connecting pin 35 may advantageously be chamfered to facilitate insertion into the through holes. In this way, a conveyor chain is securely held together by the bearing elements and the connecting pins.

The upper body 2 and the lower body 3 are manufactured as separate parts and are assembled in a fixedly and irremovably way. In order to obtain a secure attachment of the upper body to the lower body, the upper body and the lower body comprises several attachment and locking means.

Figure 3:
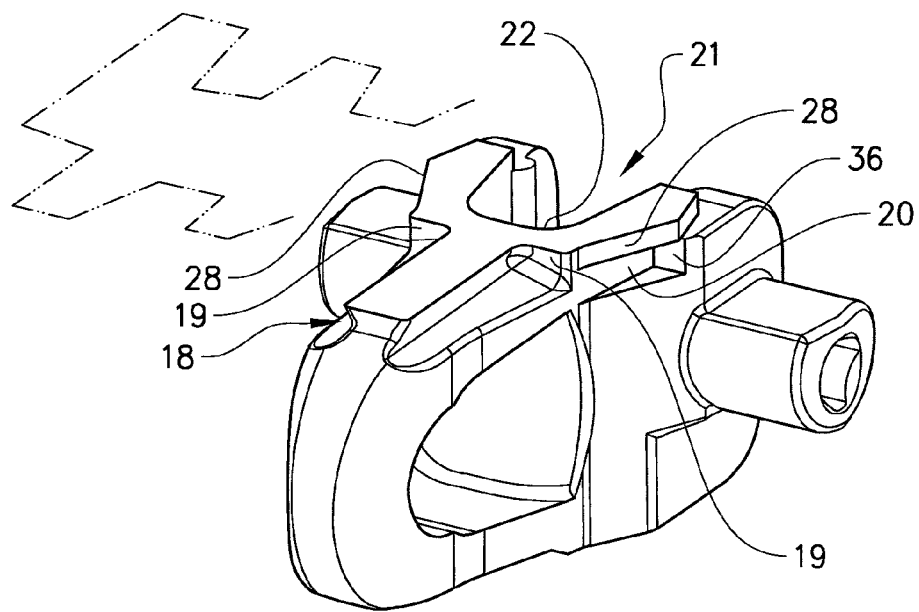
FIG. 3 shows a perspective side view of the lower body of a chain link according to the invention.

FIG. 3 shows a perspective view of the lower body 3. The lower body is provided with a longitudinal tongue 18 adapted to cooperate with a slot 17 in the upper body. The longitudinal tongue is arranged in parallel with the centre line of the chain link. The centre line is parallel to the travel direction of the conveyor chain. The tongue will cooperate with the slot such that the upper body is held in place both in a vertical direction and in a direction perpendicular to the centre line of the chain link. The slot and tongue may e.g. be shaped as a dovetail.

Further, the lower body is provided with at least one first bearing surface 19 adapted to carry forces from the upper body which are generated from the travel of the conveyor chain. At least one forward bearing surface 14 of the upper body will bear on the at least one first bearing surface 19 of the lower body. In the shown example, two first bearing surfaces 19 are provided on the lower body, one on each side of the tongue. Especially, the forward bearing surfaces and the first bearing surfaces will take up forces if the chain link jams or is caught on something since such a force will act in a direction opposite the travel direction of the conveyor chain. The force will thus press the forward bearing surfaces of the upper body against the first bearing surfaces of the lower body. There is thus no risk that the upper body will part form the lower body when an excessive force is applied to the upper body of the chain link. In the shown example, the lower body is also provided with third bearing surfaces 36 which are also perpendicular to the centre line of the chain link. The third bearing surfaces will also take up forces acting on the upper body in a direction opposite of the travel direction of the conveyor chain. Rearward bearing surfaces 37 of the upper body will bear on the third bearing surfaces 36.

The lower body is also provided with two second bearing surfaces 20 adapted to carry forces perpendicular to the centre line of the chain link. In this way, the sideway bearing surface will be able to take up sideway forces applied to the upper body and transferred from sideway bearing surfaces 15 of the upper body to the second bearing surfaces of the lower body. The second bearing surfaces may have an acute angle in relation to the centre line of the chain link. The acute angle is preferably in the interval between 5 and 20 degrees. The acute angle can help to compensate for tolerances of the upper and lower bodies, such that a tight fit between the upper body and the lower body is ensured. A second tongue 28 may be arranged above each second bearing surface 20 in order to provide a further vertical support for the upper body.

Figure 4:
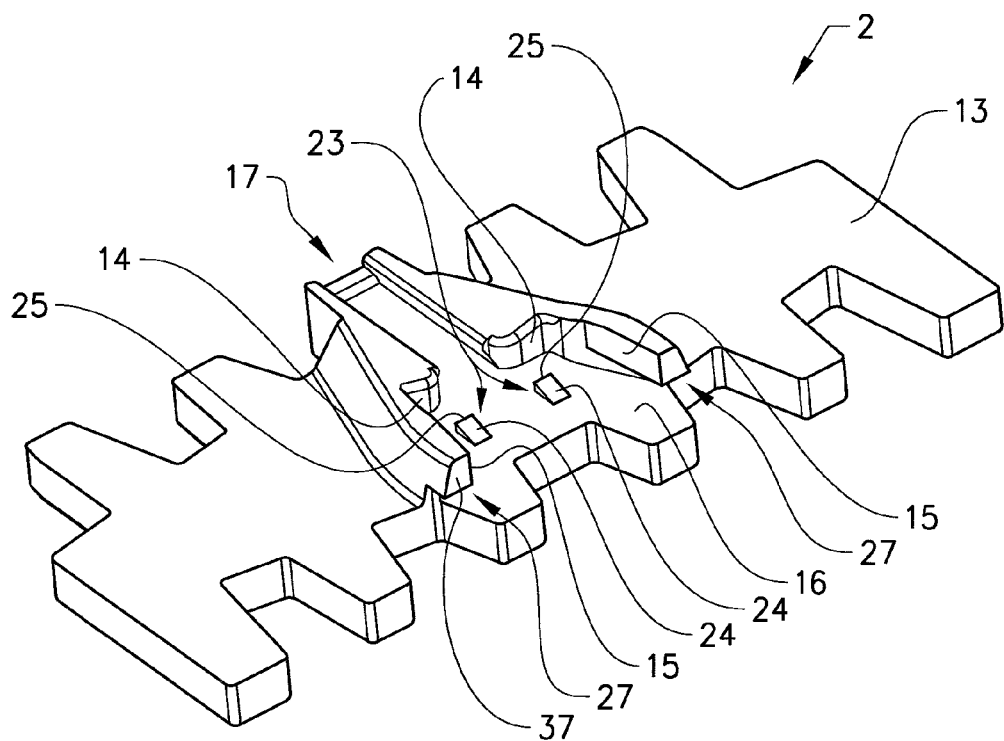
FIG. 4 shows a perspective view from below of the upper body of a chain link according to the invention.

FIG. 4 shows an example of an upper body 2. The upper body 2 is provided with a longitudinal slot 17 adapted to cooperate with the protruding tongue 18 of the lower body 3. The longitudinal slot 17 is arranged in parallel with the centre line 26 of the chain link. The centre line 26 is parallel to the travel direction of the conveyor chain. The slot will cooperate with the tongue of the lower body such that the upper body is held in place both in a vertical direction and in a direction perpendicular to the centre line of the chain link. The slot and tongue are preferably shaped as a dovetail, even though other shapes are also possible.

Further, the upper body 2 is provided with at least one forward bearing surface 14 adapted to bear on the at least one first bearing surface 19 of the lower body. In this way, forces generated from the travel of the conveyor chain and acting on the upper body are transferred to the lower body. The upper body is thus pushed to the lower body by these forces. Together with the rearward bearing surfaces 37 bearing on the third bearing surfaces 36 of the lower body, these bearing surfaces will take up the forces created if the chain link jams or is caught on something since such a force will act in a direction opposite the travel direction of the conveyor chain.

The upper body is also provided with two sideway bearing surfaces 15 adapted bear on the second bearing surfaces 20 in order to carry forces perpendicular to the centre line of the chain link. The sideway bearing surfaces 15 may be provided with an acute angle corresponding to the acute angle of the second bearing surface of the lower body. Further, a second slot 27 may be arranged between the sideway bearing surfaces 15 and the lower bearing surfaces 16 of the upper body. The second slots are arranged to cooperate with second tongues 28 of the lower body in order to take up vertical forces acting on the chain link. In this way, a strong and rigid attachment of the upper body to the lower body is obtained.

The upper body is further provided with locking means 23 adapted to lock the upper body to the lower body in an irremovable way. In the shown example, two locking means 23 are used. The locking means 23 comprises a bevelled surface 24 and an upper locking surface 25. The bevelled surface 24 is adapted to glide on the lower body when the upper body is attached to the lower body. Preferably, the locking means are positioned on each side of the slot, such that the locking means will not bear on the tongue 18 when the upper body is attached to the lower body. In this way, the locking means 23 must only glide on a small portion of the lower body. During assembly, the locking means 23 will glide on the upper surface of the lower body between the first bearing surfaces 19 and the lower locking surface 22. During this assembly, the upper body with the locking means, the lower body or both may deflect some such that the locking means can pass the upper surface. The upper locking surfaces 25 will bear on the lower locking surface 22 when the upper body is assembled. Once the upper body is assembled to the lower body, it will act as a chain link produced in one piece.

The advantage of manufacturing the chain link in two parts is that different materials can be used for the upper body and the lower body. The lower body can be manufactured in a low friction material. The upper body can be manufactured in a material adapted for the use of the conveyor chain. One such use would be a conveyor chain adapted for ESD use. Since the material must be a conductive or static dissipative material such that it can conduct electricity, the material must contain conducting particles embedded in the material, such as graphite powder, which will weaken the material. Thus, the upper conductive part of the conveyor chain can be made in one material and the lower part can be made in another material, which has a higher wear resistance.

Another advantage is that the upper body can be made from a metallic material or another non-resilient material. To manufacture a complete conveyor chain link from a metallic material is both costly and difficult and is further not desirable since the wear on the slide rails of the conveyor beams will be higher for such a conveyor chain. With the upper part of the chain link made from a metallic material, the wear of the slide rails is minimized. Since the upper part does not have any resilient catches or the like, the upper part can be made of any non-resilient material, such as stainless steel or another metal alloy. A further advantage of not having resilient catches to hold the upper body and lower body together is that there is no risk that a resilient catch will come loose during use of the conveyor chain or when the conveyor chain is caught up in something and jams.

Figure 5:
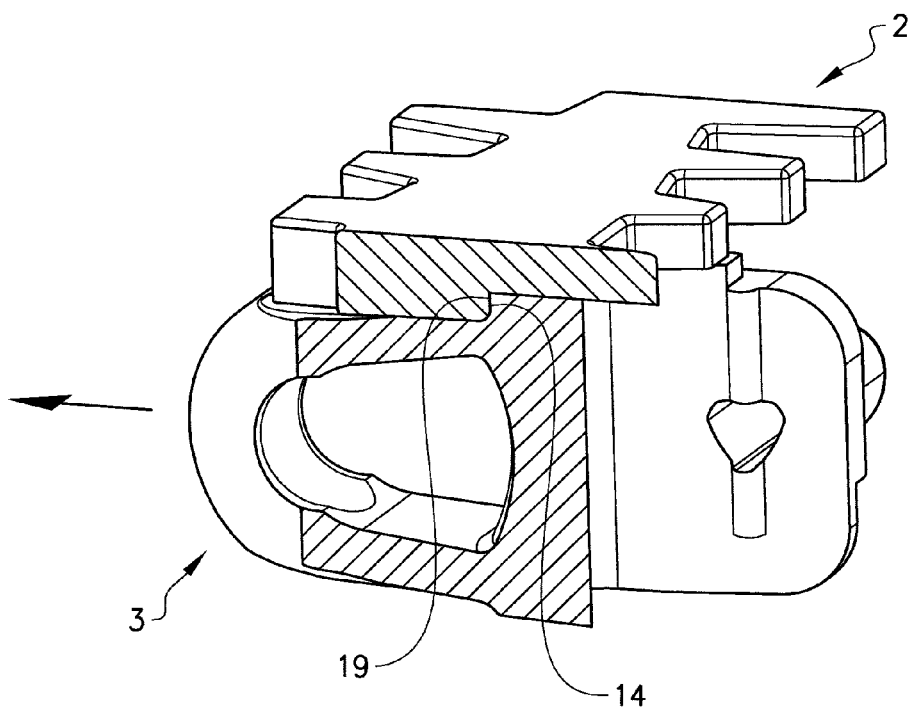
FIG. 5 shows a cut view along A-A of a chain link according to the invention.

FIG. 5 shows a cut view along plane A-A. The travel direction of the conveyor chain is indicated with an arrow. In FIG. 5, it is clearly shown how the forward bearing surface 14 of the upper body 2 bears on the first bearing surface 19 of the lower body 3. Further, the rearward bearing surface 37 will bear on the third bearing surface 36. If a force is applied on the upper body, due to e.g. a malfunction of the conveyor, the upper body will be pressed against the bearing surfaces of the lower body. This secures that the upper body will not be pushed off the lower body during use or when a malfunction occurs. Further, the upper locking surface 25 will bear against the lower locking surface 22 of the opening 21 in the lower body. Since the locking means 23 is not resilient, the upper locking surface 25 will not be able to escape the lower locking surface 22. Thus, the upper body is fixedly and irremovable attached to the lower body.

The main advantage of having a chain link comprising a separate upper and lower body being fixedly attached to each other is that different materials can be used for the upper and lower bodies. Another advantage is that different types of upper bodies can be produced and attached to the same lower body. Such types may include different sizes, shapes and surface properties. It is e.g. possible to provide the upper surface with different profiles for holding different objects.

By manufacturing the conveyor chain link or at least the lower body of a material having a low coefficient of friction, such as an acetal plastic and/or polyamide, a cost advantage and a more favourable modulus of elasticity is achieved. The lower and upper bodies are preferably produced by injection moulding, but especially the upper body may also be machined or stamped and pressed.

FIG. 6 shows part of a conveyor chain comprising a plurality of chain links as described above. The chain links are assembled to each other by the use of a bearing element 32 and a connecting pin 35. Such a conveyor chain is adapted to travel in a conveyor beam provided with slide rails. One or more conveyor chains with conveyor beams make up a conveyor system, which may also comprise other functional elements, such as diverters, stops, drive units, handling stations etc. The conveyor system is used for moving objects between different stations in e.g. a factory. The objects are conveyed by the conveyor chain, either directly or via supporting means, which are also known as pallets. Such conveyor systems are well known in the art.

The invention is not to be regarded as being limited to the embodiments described above, a number of additional variants and modifications being possible within the scope of the subsequent patent claims.

REFERENCE SIGNS

1: Conveyor chain link
2: Upper body
3: Lower body
4: Front end
5: Rear end
6: First leg
7: Second leg
8: First protrusion
9: Second protrusion
10: First through hole
11: Second through hole
12: Upper carrying surface
13: Underside
14: Forward bearing surface
15: Sideway bearing surface
16: Lower bearing surface
17: Longitudinal slot
18: Tongue
19: First bearing surface
20: Second bearing surface
21: Opening
22: Lower locking surface
23: Locking means
24: Bevelled surface
25: Upper locking surface
26: Centre line
27: Second slot
28: Second tongue
29: Notch
30: Tooth
31: Bearing seat
32: Bearing element
33: Force absorbing element
34: Third through hole
35: Connecting pin
36: Third bearing surface
37: Rearward bearing surface

The invention claimed is:

1. A conveyor chain link comprising:
an upper body having a carrying surface, and
a lower body having a front end and a rear end,
where the upper body and the lower body are separate parts,
wherein the upper body is provided with a longitudinal slot adapted to cooperate with a protruding tongue on the front end of the lower body, with at least one forward bearing surface arranged perpendicular to a centre line of the chain link and adapted to bear on at least one first bearing surface of the lower body, with two sideway bearing surfaces adapted to bear on two second bearing surfaces of the lower body, wherein the longitudinal slot is arranged in parallel to the centre line of the chain link, and that the centre line of the chain link is arranged in parallel with the travel direction of the chain link, and
at least one locking means adapted to lock the upper body to the lower body fixedly and irremovably, where the locking means is non-resilient and comprises a bevelled surface and a locking surface,
where the bevelled surface is adapted to glide on the lower body when the upper body is attached to the lower body and where the locking surfaces are adapted to bear on a locking surface of the lower body when the upper body is assembled, thereby locking the upper body to the lower body fixedly and irremovably.

2. The conveyor chain link according to claim 1, wherein the longitudinal slot is a dovetail slot and the protruding tongue is a dovetail.

3. The conveyor chain link according to claim 1, wherein the sideway bearing surfaces are arranged at an acute angle in relation to the centre line of the chain link.

4. The conveyor chain link according to claim 3, wherein the acute angle is in the interval of 5-20 degrees.

5. The conveyor chain link according to claim 1, wherein said locking means comprises a bevelled surface and a locking surface perpendicular to the lower bearing surface of the upper body.

6. The conveyor chain link according to claim 5, wherein the locking surface is adapted to cooperate with a lower locking surface of an opening in the rear end of the lower body, where a first leg and a second leg are arranged at a certain distance from each other such that the opening is created between the first and second legs.

7. The conveyor chain link according to claim 1, wherein the upper body comprises second slots arranged between the lower bearing surface and the sideway bearing surfaces, adapted to cooperate with second tongues arranged on the lower body.

8. The conveyor chain link according to claim 1, wherein the lower body is manufactured of a material having a low coefficient of friction, such as an acetal plastic and/or a polyamide.

9. The conveyor chain link according to claim 1, wherein the upper body is manufactured in a different material than the lower body.

10. The conveyor chain link according to claim 1, wherein the upper body is manufactured in a metallic material.

11. The conveyor chain link according to claim 1, wherein the upper body is manufactured in a conductive or static dissipative material.

12. A conveyor chain comprising a plurality of conveyor chain links according to claim 1.

13. The conveyor chain according to claim 12, wherein the conveyor chain further comprises a plurality of bearing elements positioned in the front end of each conveyor chain link, and a plurality of connecting pins extending through the first and second through holes of the chain link and further extending through a third through hole in the bearing element.

14. A conveyor system comprising a conveyor chain according to claim 12.

* * * * *